(12) United States Patent
Bacus et al.

(10) Patent No.: US 11,374,902 B2
(45) Date of Patent: Jun. 28, 2022

(54) FIELD DEVICE LOOP WARNING PARAMETER CHANGE SMART NOTIFICATION

(71) Applicant: FISHER-ROSEMOUNT SYSTEMS, INC., Round Rock, TX (US)

(72) Inventors: Joseph Aballe Bacus, Eden Prairie, MN (US); Jehiel Camille Geronimo Balla, Biñan (PH); Wynn Gervacio Diancin, Pflugerville, TX (US); Dashene Aren Samson, Quezon (PH)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 324 days.

(21) Appl. No.: 16/675,380

(22) Filed: Nov. 6, 2019

(65) Prior Publication Data

US 2021/0136035 A1    May 6, 2021

(51) Int. Cl.
   *H04L 9/40*       (2022.01)
   *G05B 19/418*     (2006.01)
   *H04L 67/75*      (2022.01)
   *H04L 41/0686*    (2022.01)
   *H04L 41/069*     (2022.01)
   *G06F 3/04847*    (2022.01)
   *H04L 67/125*     (2022.01)

(52) U.S. Cl.
   CPC ...... *H04L 63/0209* (2013.01); *G05B 19/4185* (2013.01); *G06F 3/04847* (2013.01); *H04L 41/069* (2013.01); *H04L 41/0686* (2013.01); *H04L 67/125* (2013.01); *H04L 67/36* (2013.01); *G05B 2219/31115* (2013.01)

(58) Field of Classification Search
   None
   See application file for complete search history.

(56) References Cited

U.S. PATENT DOCUMENTS

| | | | |
|---|---|---|---|
| 9,927,788 B2* | 3/2018 | Balentine | G05B 19/409 |
| 10,270,853 B2* | 4/2019 | Toepke | G05B 19/042 |
| 10,338,549 B2* | 7/2019 | Nixon | H04W 12/088 |
| 2011/0296330 A1 | 12/2011 | Shi | |

(Continued)

FOREIGN PATENT DOCUMENTS

GB    2 491 033 A    11/2012

OTHER PUBLICATIONS

Search Report for Application No. GB2016988.4, dated Apr. 26, 2021.

*Primary Examiner* — Ranodhi Serrao
(74) *Attorney, Agent, or Firm* — Marshall, Gerstein & Borun LLP

(57) ABSTRACT

A system for preventing inadvertent or untimely parameter changes to an active online field device from a secondary system different from a distributed control system application providing control instructions to the field device, where the parameter changes may cause detrimental effects to a plant process or activity. A request for a parameter change from the secondary system may be intercepted before the request is received by a field device or a controller for evaluation by an operator of the distributed control system. The validation process may provide a plant operator with override authority to approve or deny a set of critical parameter changes to an active field device or other active plant device.

10 Claims, 12 Drawing Sheets

(56) References Cited

U.S. PATENT DOCUMENTS

| | | | |
|---|---|---|---|
| 2018/0026840 A1* | 1/2018 | Toepke | H04L 67/12 |
| | | | 709/222 |
| 2018/0027071 A1* | 1/2018 | Toepke | H04L 67/1095 |
| | | | 709/217 |
| 2018/0107178 A1* | 4/2018 | Nixon | H04L 41/069 |
| 2018/0107179 A1* | 4/2018 | Nixon | H04L 12/4625 |
| 2018/0107188 A1* | 4/2018 | Nixon | G05B 19/052 |
| 2018/0109417 A1* | 4/2018 | Nixon | G05B 19/41855 |
| 2018/0109651 A1* | 4/2018 | Nixon | H04L 41/0806 |
| 2018/0109955 A1* | 4/2018 | Nixon | H04L 43/045 |
| 2019/0101910 A1* | 4/2019 | Schleiss | G05B 23/0272 |

\* cited by examiner

FIELD DEVICE LOOP WARNING PARAMETER CHANGE SMART NOTIFICATION

FIELD OF TECHNOLOGY

The present disclosure relates generally to process control systems, and, more particularly, to a process control system that is communicatively coupled to a separate secondary system that has independent access to devices of the process control system and where write commands to a plant device are validated between the two systems.

BACKGROUND

A distributed control system (DCS) of a plant may include field devices, input/output (I/O) devices, controllers and operator workstations. This distributed control system may include applications necessary to coordinate and control various processes in a plant. Other ancillary tools and applications have developed to support plant operations but may not be a part of direct plant control. Such functions may include device maintenance and health monitoring that can be performed by asset management systems or asset maintenance systems. Because maintenance and health monitoring functions traditionally require access to plant devices (sometimes direct physical access to a plant device by instrumentation technicians), development of asset management systems may have introduced independent access to field devices actively being controlled by the DCS in live plant operations.

Because independent communication paths may exist between an AMS and a DCS application to a same set of plant devices, there exist situations where an instrumentation technician may initiate a write command to a field device that may change an active control process without knowledge or approval from a user on the operational side of the process control system, such as a DCS operator. Because the operator may have more knowledge on current active processes in the plant being controlled by the DCS, the present method and system may provide a validation process that involves active input and information from the DCS side before a write command can be executed or committed to a plant device.

SUMMARY

The present disclosure describes a distributed control system including at least one controller and one field device and a second system that has independent access to the plant devices of the DCS, where write commands from the second system to the DCS plant devices are intercepted for an approval process. The approval process may include transmitting a notification to a DCS workstation to alert an operator that a write command or parameter change command for a field device or other plant device of the DCS is intercepted. The process may involve the DCS workstation transmitting an approval decision with respect to the parameter change command. The approval decisions can then be used to either release the intercepted parameter change command for execution or commitment at the field device or other plant device, or terminate the parameter change command.

In some embodiments, intercepting of the parameter change command is performed by a security services module. The security services module may be a component of the second system or in some embodiments, the security services module may perform some of its functions independently of the second system. In some embodiments, a workstation of the second system may receive the approval decision from the DCS and display a message corresponding to the approval decision to a user of the second system. In some embodiments, the second system may be an asset management system or an asset maintenance system used to provide plant device health monitoring and maintenance.

DETAILED DESCRIPTION

Figure 1:
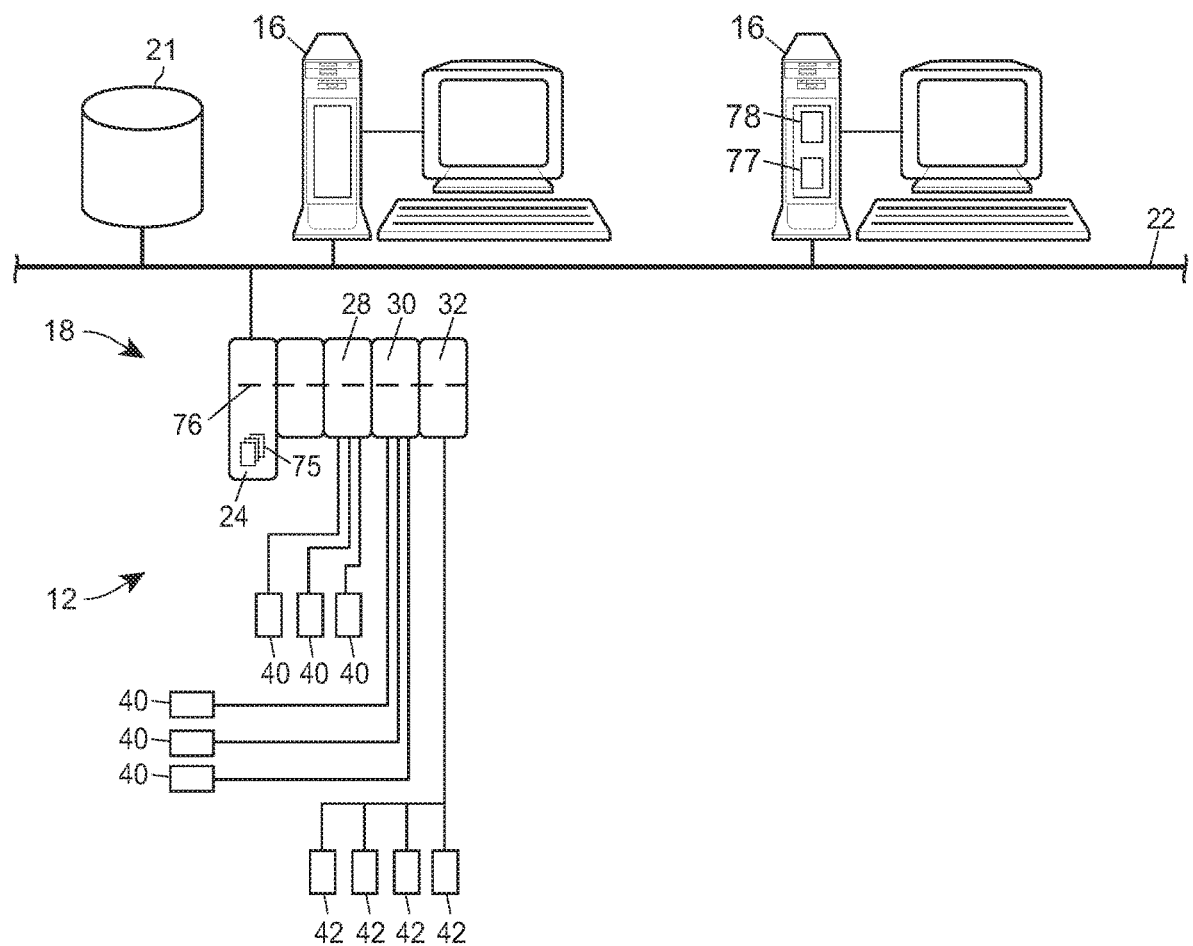
FIG. 1 is a block diagram of a distributed process control network located within a process plant or other industrial setting including industrial computing devices each having a platform using a communication architecture.

FIG. 1 illustrates a process control system 12 in a process plant 10. More particularly, process control system 12 may represent a distributed process control system or DCS. The process plant 10 also includes one or more host workstations, computers or user interfaces 16 (which may be any type of personal computers, workstations, etc.) that are accessible by plant personnel, such as process control operators, maintenance personnel, configuration engineers, etc. In the example illustrated in FIG. 1, a user interface 16 is shown as being connected to a process control node 18 and to a configuration database 21 via a common communication line or bus 22. The communication network 22 may be implemented using any desired bus-based or non-bus based hardware, using any desired hardwired or wireless communication structure and using any desired or suitable communication protocol, such as an Ethernet protocol.

Generally speaking, node 18 of the process plant 10 includes process control system devices connected together via a bus structure that may be provided on a backplane into which the different devices are attached. The node 18 (which may represent a plurality of nodes) is illustrated in FIG. 1 as including a process controller 24 (which may represent multiple controllers) as well as one or more process control system input/output (I/O) devices 28, 30 and 32. Each of the process control system I/O devices 28, 30, and 32 is communicatively connected to a set of process control related field devices, illustrated in FIG. 1 as field devices 40 and 42. The workstation 16, process controller 24, the I/O devices 28-32 and the controller field devices 40 and 42 generally make up the distributed process control system (DCS) 12 of FIG. 1.

The process controller 24, which may be, by way of example only, DeltaV™ controllers sold by Emerson Process Management or any other desired type of process controllers, are programmed to provide process control functionality (using what are commonly referred to as control modules) using the I/O devices 28, 30 and 32, and the field devices 40 and 42. In particular, controller 24 implements or oversees one or more process control routines 75 (also referred to a control modules) stored therein or otherwise associated therewith and communicates with the field devices 40 and 42 and the workstations 16 to control the process 10 or a portion of the process 10 in any desired manner. The field devices 40 and 42 may be any desired types of field devices, such as sensors, valves, transmitters, positioners, etc., and may conform to any desired open, proprietary or other communication or programming protocol including, for example, the HART or the 4-20 ma protocol (as illustrated for the field devices 40), any fieldbus protocol such as the Foundation® Fieldbus protocol (as illustrated for the field devices 42), or the CAN, Profibus, the AS-Interface protocols, to name but a few. Similarly, the I/O devices 28-32 may be any known types of process control I/O devices using any appropriate communication protocol(s).

A common backplane 76 (indicated by a dotted line through the controller 24 and the I/O devices 28-36) is used in each of the nodes 18 to connect the controller 24 to the process control I/O cards 28, 30 and 32. The controller 24 is also communicatively coupled to, and operates as a bus arbitrator for the bus 22, to enable each of the I/O devices 28-32 to communicate with any of the workstations 16 via the bus 22.

FIG. 1 illustrates that multiple workstations 16 may be coupled to the DCS. The workstations may be programmed to execute standard operational control applications for running the plant. These standard operational control applications may be considered as part of the DCS as they may be required to control and manipulate a plant process using field devices. In addition to workstations used to operate the plant, some workstations may be coupled externally to the bus 22 and run applications for secondary functions outside DCS operational control. In other words, some of these applications may have access to plant devices that do not directly involve operational control of the plant such as plant device maintenance and monitoring. One such application is an asset management system.

Figure 2:
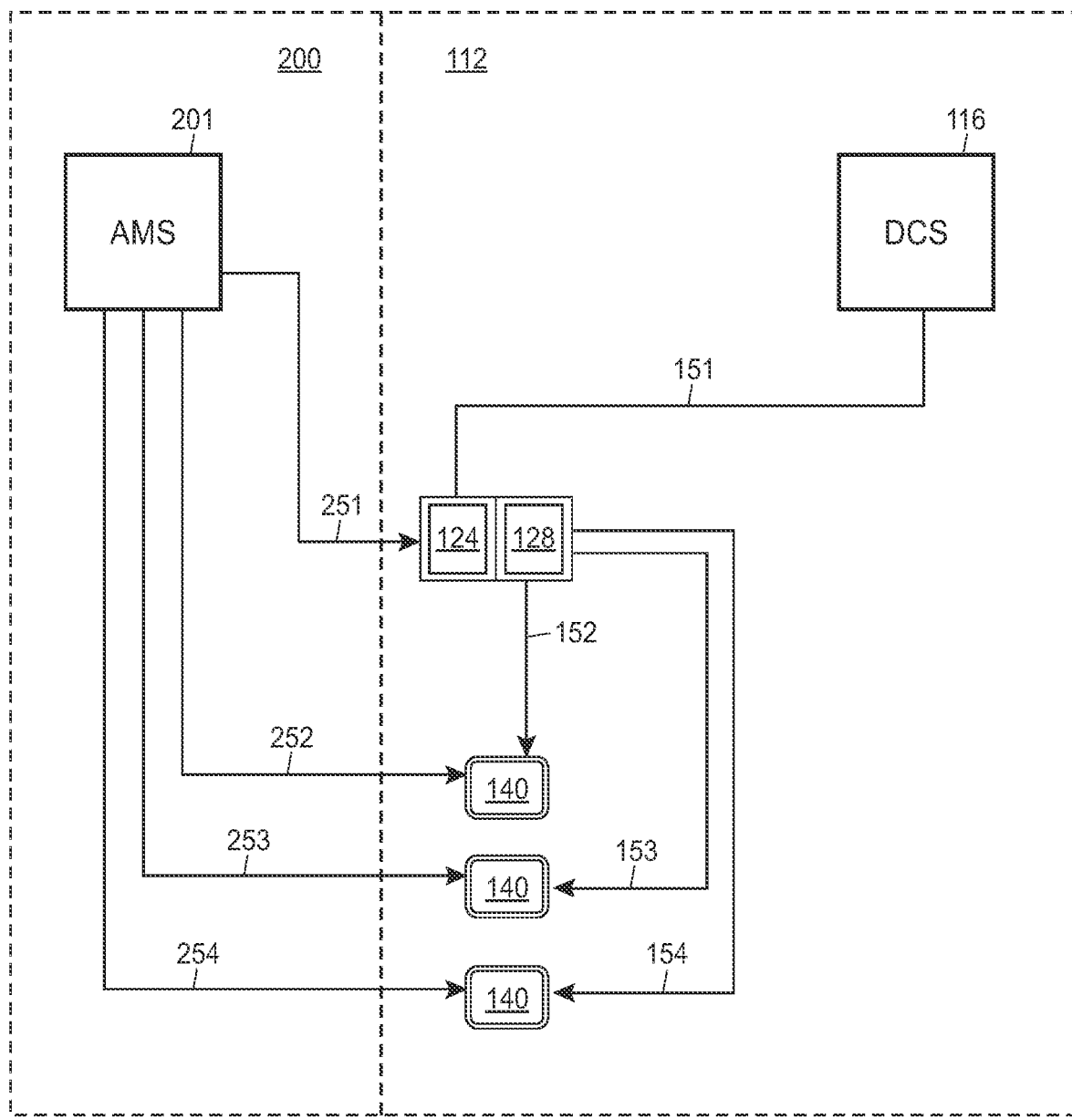
FIG. 2 illustrates an asset management system (AMS) that may be coupled to a distributed process control system (DCS).

FIG. 2 illustrates an asset management system (AMS) 200 that may be coupled to a distributed process control system (DCS) 112. Similar to FIG. 1, DCS 112 of FIG. 2 may include at least an operator workstation 116, at least one controller 124, at least one I/O device 128 and one or more field devices 140. FIG. 2 illustrates that each of the DCS 112 plant devices (124, 128, 140) may communicate within the DCS system using communications lines 151, 152, 153, or 154.

FIG. 2 illustrates that devices of the DCS 112 may also be communicatively coupled to the AMS 200. The AMS 200 may include a computer or workstation 201, which may represent a plurality of workstations or computing devices, that may be used to execute maintenance functions for plant devices. The workstation 201 may provide a user interface to, for example, an instrumentation technician, whose role is to monitor and maintain one or more of the devices of the DCS 112. The DCS 112 may be under the control of one or more plant operators that interact with the DCS 112 through one or more operator workstations 116 using a DCS control program. The AMS computing device 201 may also represent a network of one or more workstations or servers providing the monitoring and maintenance functionality to a plurality of users.

Generally, the AMS 200 may manage information pertaining to one or more of the devices or components of the DCS 112. In some industries, an asset management system (AMS) 200 may also be called an asset maintenance system. The AMS 200 may monitor and collect information from plant devices and perform diagnostics to identify different failure symptoms of the plant devices. For example, overall health and lifespan of plant devices and assets may be ascertained and recorded through functions and tools of the AMS 200. In operation, the AMS 200 may perform various tests on plant devices to obtain information for calculating device health and maintenance requirements of the plant devices. In some embodiments, an AMS 200 may perform read and write operations on plant devices such as controllers 124, I/O devices 128, field devices 140 and any other plant devices. Based on diagnostics performed by the AMS 200 on the information extracted from the plant devices, the AMS 200 may be programmed to prompt a user to make adjustments or modify parameters of a plant device such as a controller 124, an I/O 128, or a field device 140 to improve its efficiency. A typical user of the AMS 200 may be an instrumentation technician. In some embodiments, the AMS 200 may be programmed to automatically adjust or modify parameters of a plant device such as a controller 124, an I/O 128, or a field device 140 to improve its efficiency.

As illustrated by FIG. 2, the AMS 200 may be communicatively coupled to one or more devices 124, 128, 140 of the DCS 112 separately and independently from the DCS 112. Communication lines 251-254 may represent a separate or a segregated communication network independent from a communication and control network 151-154 of DCS 112.

For example, as illustrated in FIG. 2, the AMS may have physical communication lines 251-254 and ports (not shown) to one or more of the devices of the DCS separate from communication lines 151-154 and ports used by the devices to communicate with other components or devices of the DCS 112. In some embodiments, the AMS 200 may communicate with devices of the DCS 112 via separate logical ports than those used by the DCS 112 to send control signals or to communicate between devices of the DCS 112. Because of the separate and independent communication paths between the AMS 200 and the DCS 112 to the plant devices 124, 128, 140, an instrumentation technician may make a modification to a plant device 124, 128, 140 without knowledge or approval of a plant operator where the modification may result in an unwanted or damaging effect on a current plant process.

Figure 3:
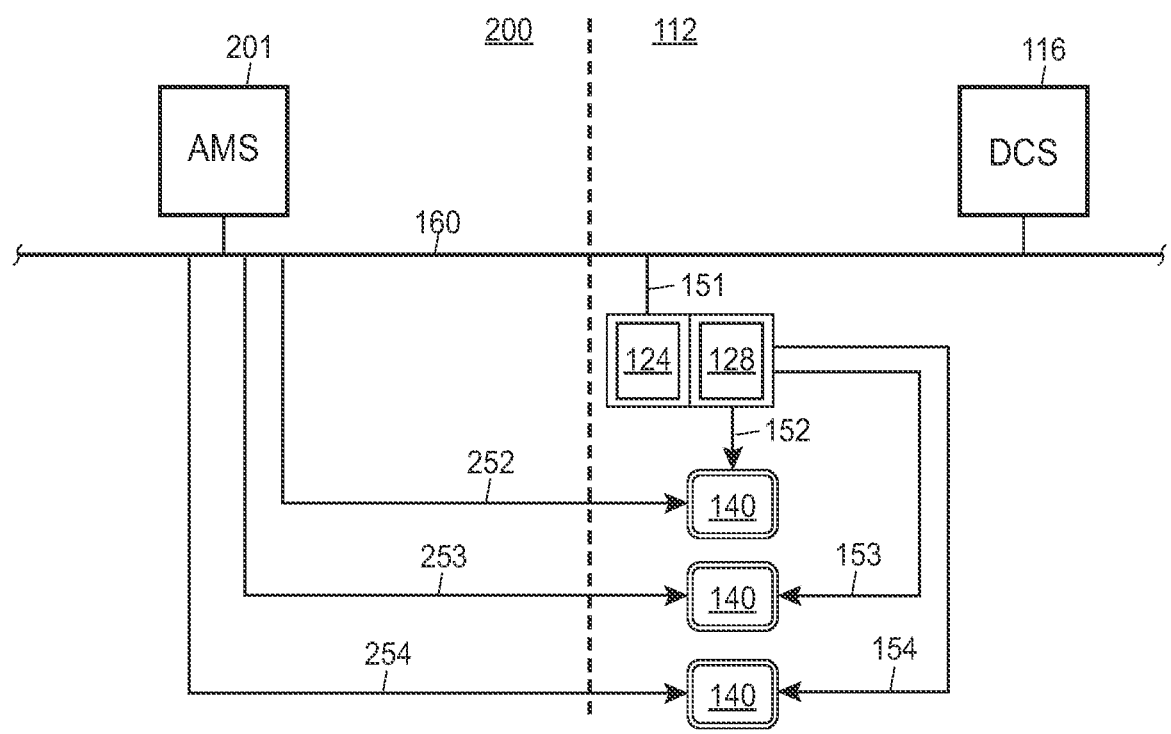
FIG. 3 illustrates a system where an AMS may share a communication network with a DCS to communicate with plant devices.

FIG. 3 illustrates a system where the AMS 200 may share a communication network 160 with the DCS 112 to communicate with plant devices 124, 128, and 140. The AMS 200 and DCS 112 of FIG. 3 may be similar to that of FIG. 2 and is labeled similarly. The shared communication network 160 may be an Ethernet network, for example. While the communication between the plant devices and the AMS and DCS may share a common communication network, line, or link 160 to the controller 124, field device 140, or other plant device, the AMS may able to communicate directly with a plant device 124, 128, 140 and transmit commands to change or modify parameters of the plant device 124, 128, 140 without first communicating with or through the DCS system 112 or operator application (executing, for example, at workstation 116). In the system of FIG. 3, both the AMS 200 and DCS 112 may communicate directly with a controller 124 or field device 140 or any other device of the plant using a common plant network 160, where the AMS 200 does not need to communicate through DCS 112, via a controller application running on workstation 116. More specifically, the systems of FIGS. 2 and 3 illustrate that an AMS 200 may have the capability to make parameter modifications to plant devices such as controllers 124, I/Os 128, and field devices 140 unilaterally. To simplify further discussion with respect to parameter modifications of plant devices, where AMS initiated parameter modifications are described to apply to a controller or to a field device, it should be understood that in any embodiment described or claimed in this application, the AMS may be capable of performing the same or similar parameter modifications to any or all of the components of the DCS (e.g., servers, workstations, controllers, I/Os, field devices, etc.).

Figure 4:
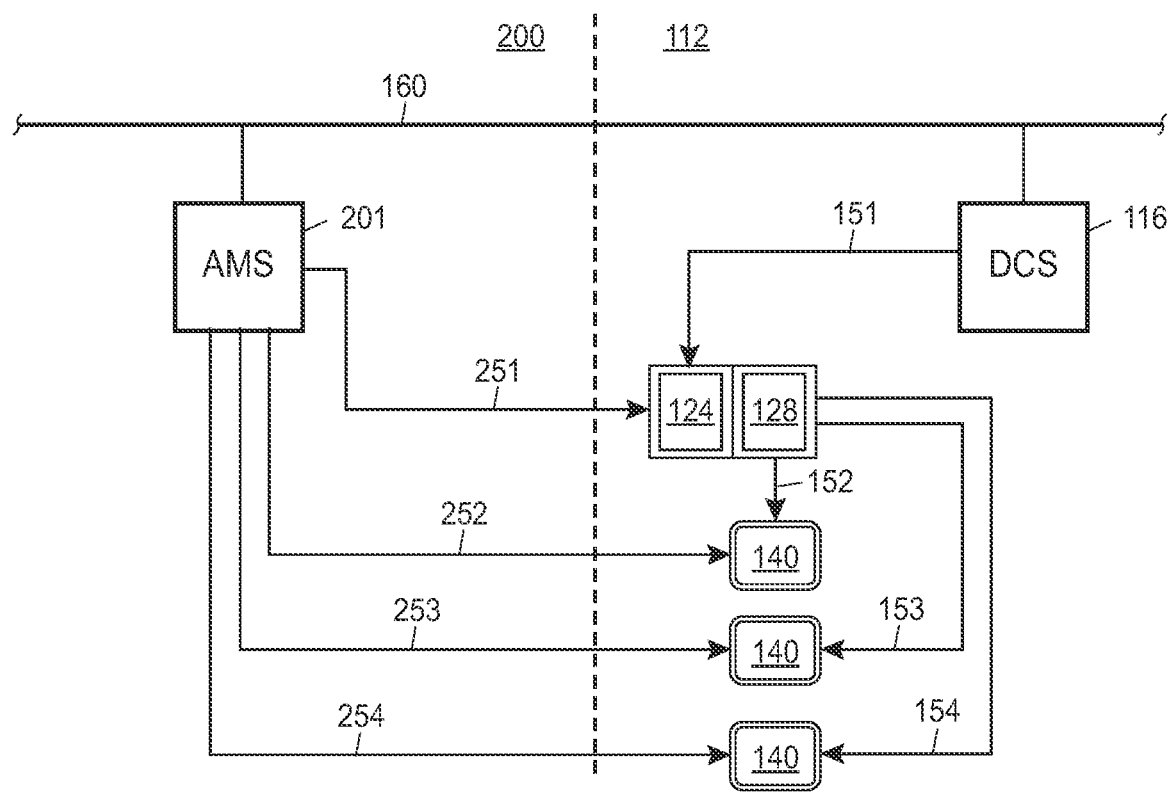
FIG. 4 illustrates another system where an AMS is coupled to a DCS via one communication network while using a separate communication network to communicate with plant devices.

FIG. 4 illustrates another system where an AMS is coupled to a DCS. In the architecture of FIG. 4, the DCS and AMS may be communicatively coupled to each other via a communication network 160 that connects between workstation 201 of AMS 200 and workstation 116 of DCS 112. In this situation, there may be some level of information exchange between the two systems, although each can still make modifications to field devices independently of one another. While the systems of FIGS. 2-4 may include shared communication lines between an AMS 200 and DCS 112, a problem may still arise when the actions of a user of AMS 200, such as an instrumentation technician, conflict with a DCS 112 controller's operation of the plant in a potentially damaging way. This conflict may arise simply because the level of knowledge and awareness of current process activities within the plant is higher with an operator currently engaged in managing those processes than in a instrumentation technician whose maintenance duties are more periodic.

Generally, the AMS 200 may collect information from a plant device 124, 128, 140 to determine health of various plant devices and to improve device operation. In this manner, the AMS 200 may assist an instrumentation technician in providing field device maintenance, upkeep, and update. The AMS 200 may prompt a user to make adjustments based on its calculations or in some systems the AMS 200 may make a set of adjustments automatically. In many situations, collecting the information needed to determine health and provide suggested adjustments requires one or more tests be executed on a target plant device, such as 124, 128, or 140. In the process of testing, one or more device parameters or configuration parameters may need to be modified. Accordingly at least two situations may require parameter modifications of a controller or field device by an AMS: during testing and device correction after testing.

Problems may arise, however, when a device is active or commissioned when testing is to be initiated or adjustments are to be made by a user outside of the DCS 112 operational environment, such as when using AMS 200. While testing devices of a DCS 112 would be ideally performed when a field device 124 is inactive or offline, taking a device offline may be impractical or difficult. This may be the case when critical processes are currently taking place and the plant processes cannot be shut down. Similarly, situations may arise when an instrumentation technician needs to test a plant device that is showing a fault or showing symptoms of a possible malfunction or degradation in function while the device is in operation and active.

Given that the systems of FIGS. 2-4 allow a secondary system such as an AMS to make modifications to a plant device outside the DCS, conflicts may arise when a maintenance procedure involving a parameter modification to an active commissioned field device (e.g., a write command) may cause a damaging operational change in a live process. While instrumentation technicians may be trained to use caution in determining whether a test on a DCS field device or a write command may negatively impact or interfere with an active plant process, many times the instrumentation technician may not be currently informed of all processes in a plant that may negatively impacted by modifying a plant device. At least in some cases, the instrumentation engineer may not have current situational knowledge of the process that a DCS plant operator may possess. In these situations, a potential hazard may exist when an active plant device is modified without the knowledge of a plant operator. While this problem is described herein to exist between an AMS and a DCS, this problem may be generalized to plant systems where an independent system outside the DCS can independently modify parameters of a plant device within the DCS.

Figure 5:
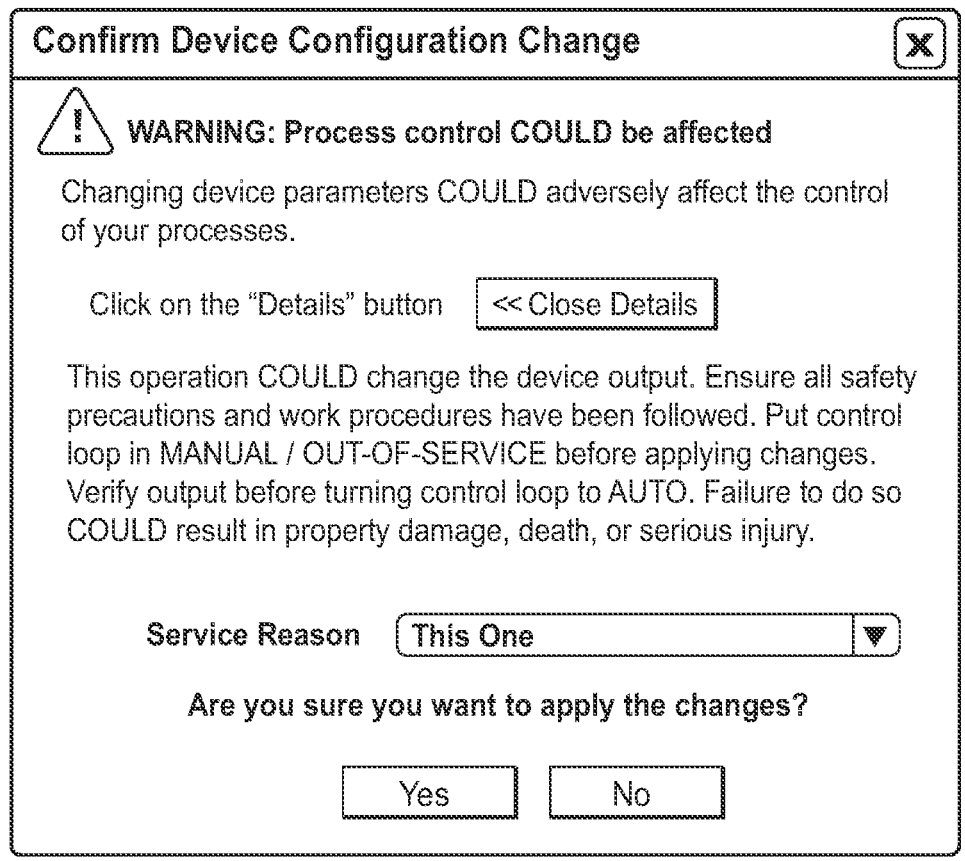
FIG. 5 illustrates an example warning screen for a user interface of an AMS without an approval process.

In some existing systems, a simple warning screen may be presented to a user at a terminal or workstation of the AMS to caution the user that a modification to a parameter may negatively impact a system. FIG. 5 illustrates an example warning screen. In this embodiment, some critical variables that are known to have significant impacts on an active plant device may be categorized as a high priority set and a warning process may be implemented around attempts at modifying these parameters. In some systems, this high priority set may be designated as a set called loop_warning_variables. In some embodiments, the loop_warning_variables may include parameters that may significantly change a process control loop current within a module or section of the plant. In systems having a set of loop_warning_variables, the warning screen of FIG. 5 may be displayed whenever a change is attempted on a parameter within the loop_warning_variables. In some embodiments, loop_warning_variables may be a set of parameters that may significantly impact a process control loop current, as defined by a threshold value.

While having a warning such as illustrated in FIG. 5 may alert or remind a user to possible problems with modifying a high priority parameter set (e.g., loop_warning_variables), the warning may not prevent a modification or write command to be executed at a plant device where an operator would have more knowledge about hazardous outcomes. In particular, a simply warning screen may not curtail conflicts with plant operation that an instrumentation technician of the AMS may have no knowledge of.

Figure 6:
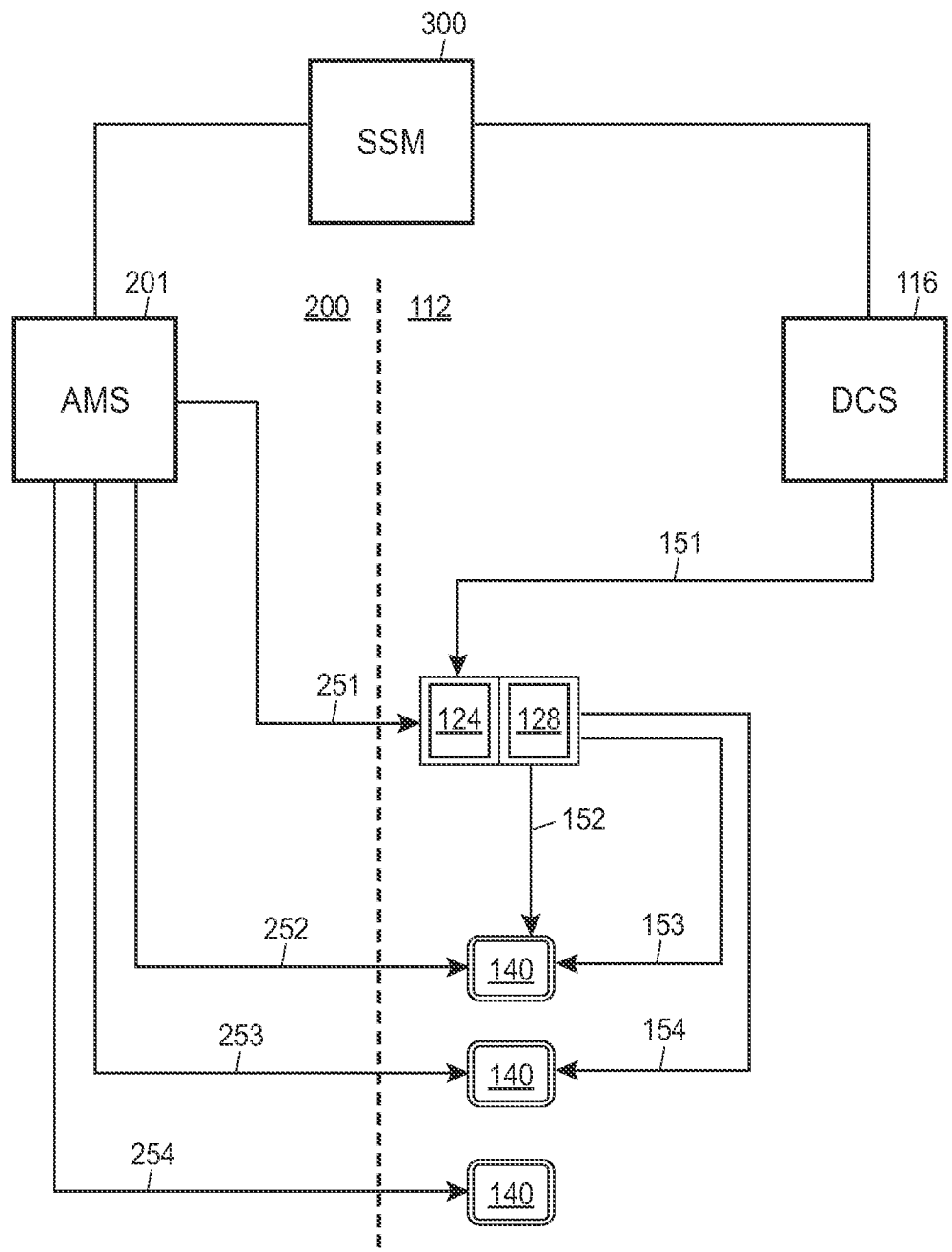
FIG. 6 illustrates a system similar to that of FIG. 2 with the addition of a security services module being communicatively coupled between an AMS workstation and a DCS operator workstation.
Figure 7A:
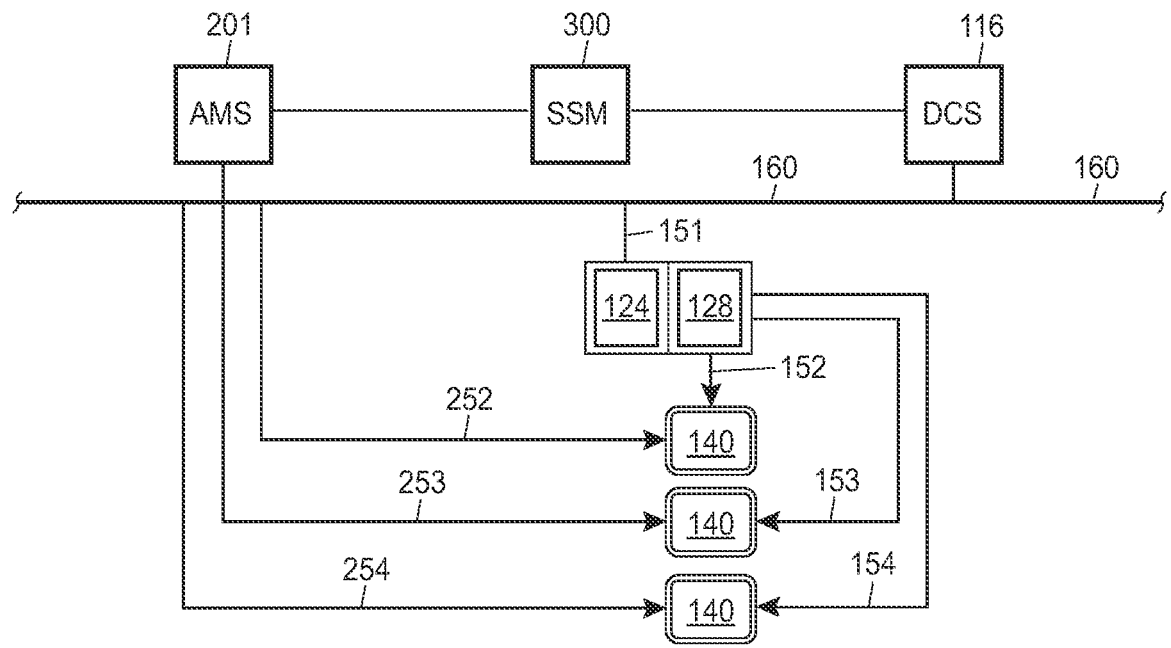
FIG. 7A illustrates the system of FIG. 3 with the addition of a security services module being communicatively coupled between the AMS workstation and a DCS operator workstation.
Figure 7B:
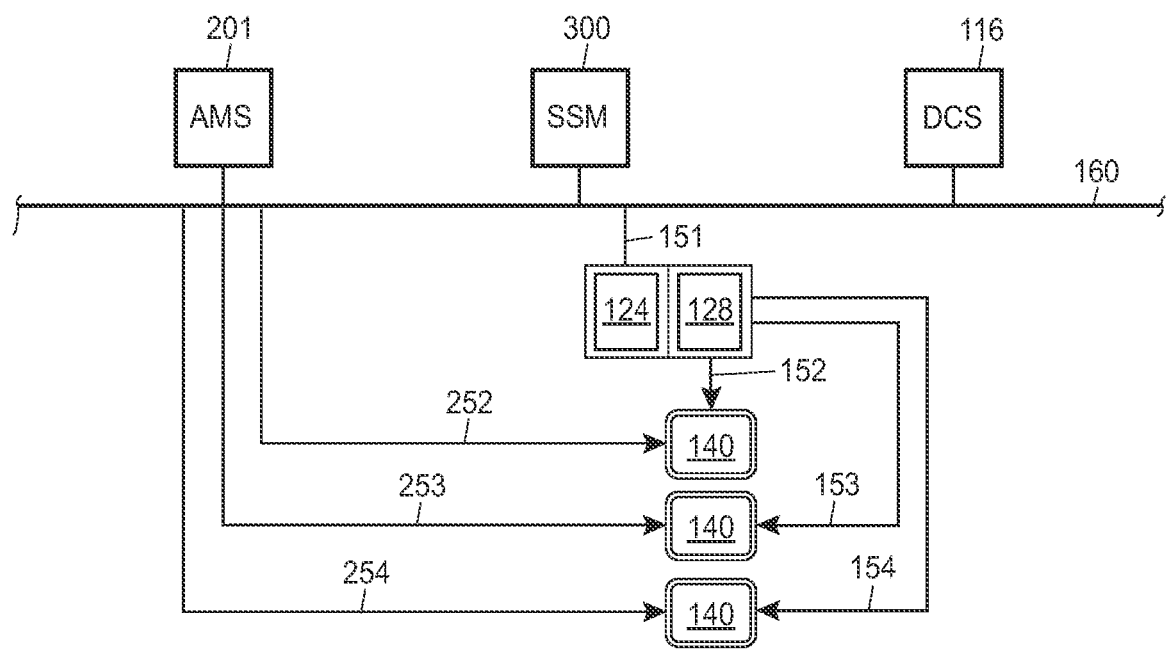
FIG. 7B illustrates an communication architecture similar to that of FIG. 7A with a security services module being communicatively coupled to a common network instead of directly between an AMS workstation and a DCS workstation.
Figure 7C:
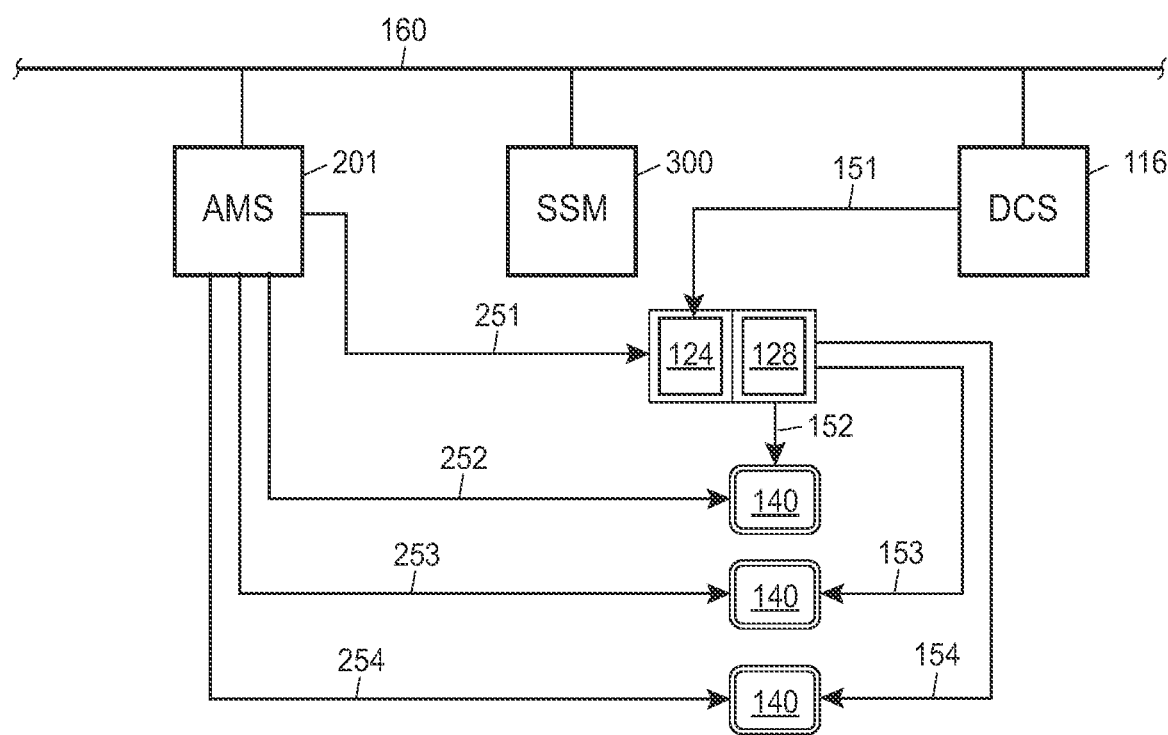
FIG. 7C illustrates the system of FIG. 4 with the addition of a security services module being communicatively coupled between an AMS workstation and a DCS operator workstation.
Figure 8:
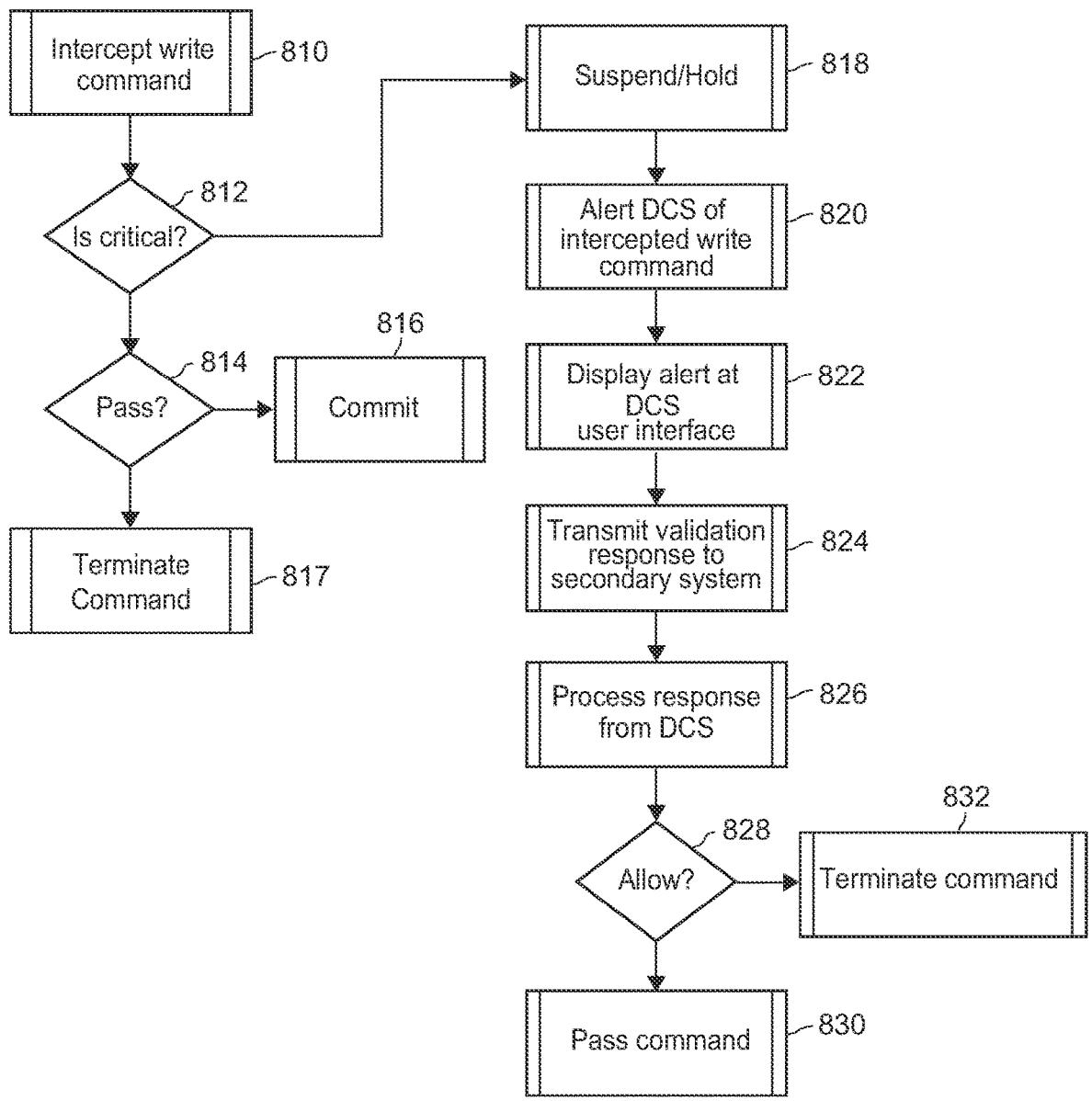
FIG. 8 illustrates a method for validating or sanctioning a write command or parameter change command to a plant device in a distributed control system.

FIGS. 6-8 illustrate that a first system (such as an DCS 112) having access to plant devices 124, 128, and 140 and a second system (such as an AMS 200) having access to the same plant devices 124, 128, and 140 may be communicatively coupled to a security services module (SSM) 300 that can provide a change approval process between users of an AMS workstation 201 attempting to modify a plant device 124, 128, 140 and a plant control system operator of the DCS 112 actively managing a plant device in a live plant operation. In these architectures, the security services module (SSM) 300 may intercept a write command or parameter change command being sent to a field device or other plant device until an approval process is performed. In some embodiments, only write commands involving loop_warning_variables may be directed to or intercepted by the security services module for approval. In other embodiments, all write commands may be first directed to the security services module for approval. For expediency, many of the embodiments and descriptions herein refer to intercepting a parameter change command for a field device. However, it should be noted that unless otherwise specified, the methods, processes and systems described herein are equally applicable to intercepting parameter change commands for any plant device. The plant devices may include field devices, input/output devices, process controllers and any other devices that can be modified independently of the DCS control and communication structure, including field devices, input/output devices, and process controllers. The term process control device may include filed devices, input/output devices, and process controllers.

FIGS. 6-8 illustrate various methods in which the SSM can be communicatively coupled to the AMS and DCS. FIG. 6 illustrates the system of FIG. 2 with the addition of a security service module 300 being communicatively coupled between the AMS workstation 201 and a DCS operator workstation 116. Similar to the architecture of FIG. 2, the AMS 200 and the DCS 112 of FIG. 5 have separate and independent access to plant devices 124, 128, and 140. In the system of FIG. 5, the SSM may be able to coordinate between the AMS and DCS to intercept parameter change commands originated by the AMS for further approval processing.

FIG. 7A illustrates the system of FIG. 3 with the addition of a security services module 300 being communicatively coupled between the AMS workstation 201 and a DCS operator workstation 116. Similar to the architecture of FIG. 3, the AMS 200 and the DCS 112 of FIG. 7A share a common network link 160 for communicating with plant devices 124, 128, and 140 where the two systems 200 and 112 have the ability to independently access the plant devices but for the SSM 300 which can now intercept write commands from the AMS workstation 201 and hold or suspend those commands pending an approval from a DCS workstation 116. FIG. 7B illustrates an architecture similar to that of FIG. 7A with the security services module being communicatively coupled to common network 160 instead of directly between the AMS workstation 201 and DCS workstation 116. In both FIGS. 7A and 7B the SSM 300 can perform its function of intercepting parameter change commands and suspending those commands until an approval process is performed.

FIG. 7C illustrates the system of FIG. 4 with the addition of a security services module 300 being communicatively coupled to the AMS workstation 201 and a DCS operator workstation 116. Also similar to the architecture of FIG. 4, each of the AMS 201 workstation and DCS workstation 116 have independent physical communication line access to each of the plant devices but may share a common network 160 between each other. In this architecture, the SSM may be able to utilize the same common network 160 between the AMS 200 and DCS 112 to perform its intercepting functions. In one embodiment, as further described below, the AMS may be programmed to communicate with the SSM to seek approval before generating or transmitting any parameter change commands. In some embodiments having the architecture of FIG. 7C, the process control devices (e.g., controllers or field devices) may be locked from write access and require a token or unlocking key from the SSM before a parameter change command may be received by the process control device.

FIG. 8 illustrates a method for sanctioning or approving a write command or parameter change command for a plant device in a distributed control system. The write command or parameter change command may be a request for a parameter change, a set of instructions for a parameter change, or any modification command that when received by a plant device may cause the parameter change to be put in effect, committed, or otherwise implemented.

At block 810, the system may intercept a write command for a parameter change of a field device. A security services module may perform the intercepting. The security services module may be a component of a server or workstation of a second system different from the DCS such as an AMS. Alternatively, the intercept functionality may be implemented as a running program of a server managing a communication network common between the second system and the DCS. The system may determine at block 812 whether the command is for a critical parameter change. If the command is not for a critical parameter change, the system may optionally prompt the user to confirm that the parameter change command is correct at block 814 and whether to allow or pass the command. If the user confirms the command, the command may be sent and/or committed to the plant device at a block 816. In some embodiments, a DCS system may have a programmed or defined set of critical, high priority variables such as a loop_warning_variables set that the system identifies as critical or high priority. In these embodiments, write commands or change commands to parameters or variables outside the set of loop_warning_variables may be considered non-critical and block 812 may be used to differentiate between critical and non-critical parameter sets. If the user rejects the command, the command may be terminated at block 817.

If the command is determined to be for a critical parameter change at block 812, the system may suspend the command for a critical parameter change of the field device at block 818. Suspending the transmission of the command may involve placing the command in a hold state or condition. In some embodiments, suspending the change command may involve placing the command in a temporary hold queue or cache until it has been processed or approved (further described below) and then either released (for example, if approved) or terminated (for example, if rejected). It should be noted that the command at decision block 812 may apply to embodiments where only critical or high priority parameter changes are intercepted and suspended to undergo an approval process. However, in other embodiments the system may intercept all parameter changes from a secondary system to a field device. In this case, the process would bypass block 812 and proceed from block 810 directly to block 818.

Figure 10:
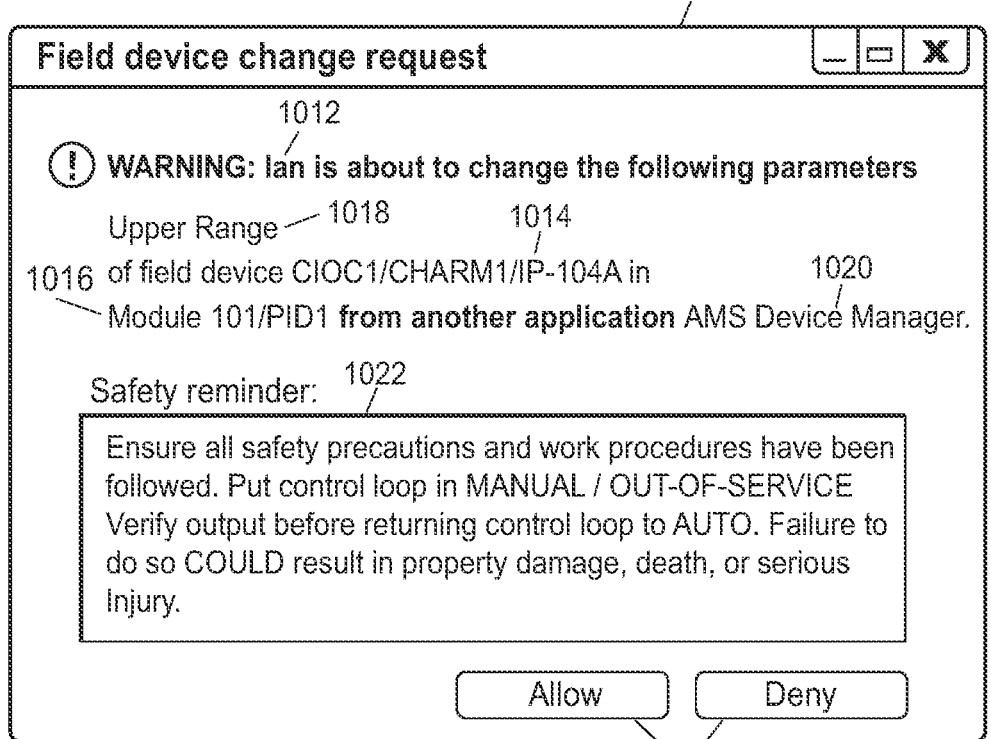
FIG. 10 illustrates a possible alert that may be displayed at an operator workstation of the DCS to indicate that a parameter change command is intercepted.
Figure 9:
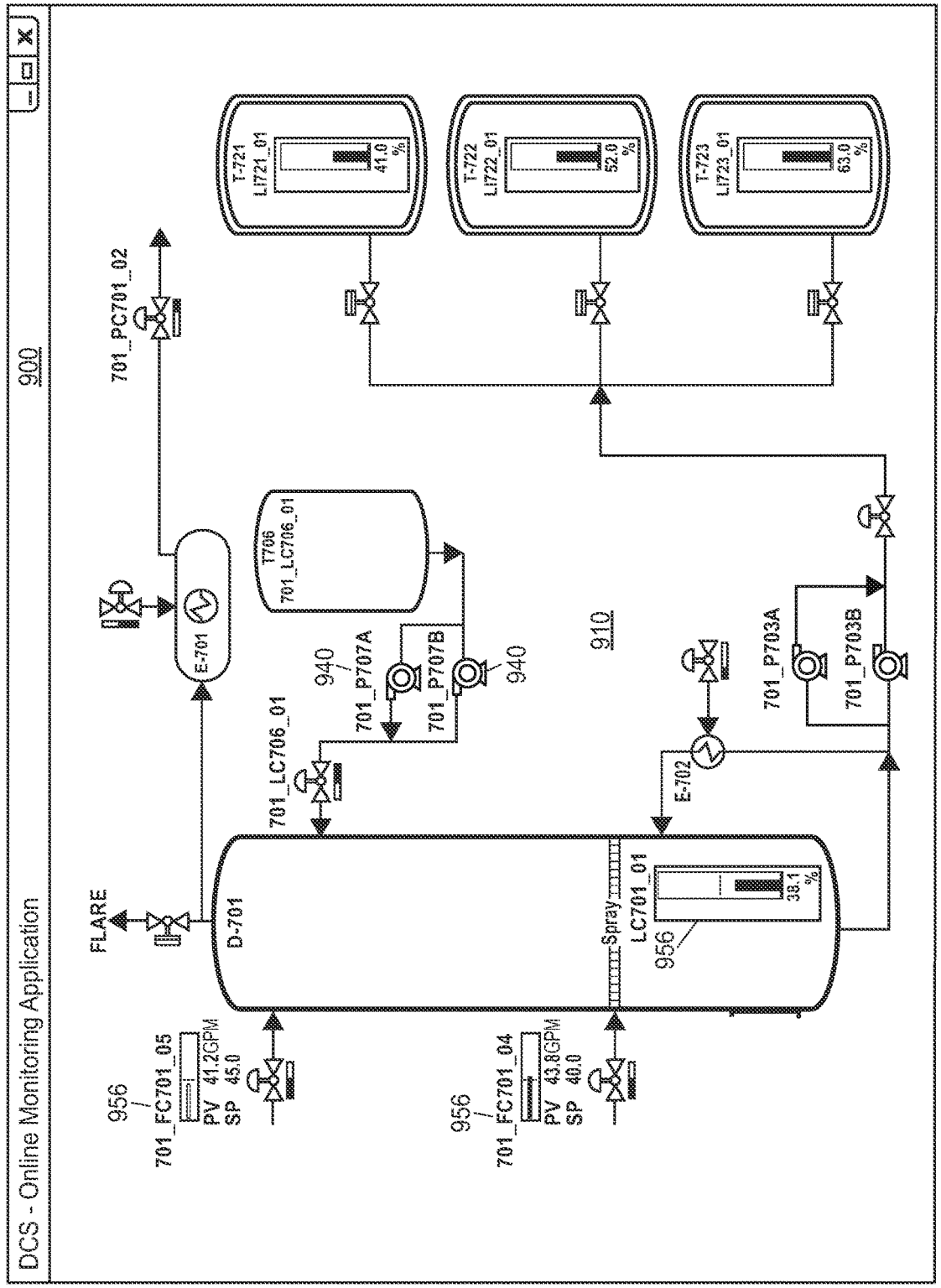
FIG. 9 illustrates a possible controller's graphical user interface 900 showing a dashboard view of a portion of a process within a plant and with an overlay of a distributed control system.

At block 820, the system may alert the DCS of an intercepted write command from a secondary system (e.g., a system external to the DCS). Block 820 may generate and transmit an alert or a warning message to a user interface device of the distributed process control system (DCS) indicating that a command for the critical parameter change has been intercepted. When a user interface of the DCS, such as workstation 116 of DCS 112 receives the alert, the user interface may display the alert over an existing DCS control display. FIG. 9 illustrates a possible controller's graphical user interface 900 showing a dashboard view of a portion of a process within a plant and with an overlay of a distributed control system. FIG. 9 illustrates a graphical representation of a portion of a process plant 910, being managed by a DCS application and shows one or more field devices 940 positioned around activities within a plant. This graphical user interface (GUI) 900 may represent an aspect of an operator monitoring application of a DCS being run on any one or more of the workstations 16 of FIG. 1. Generally, an operator may use GUI 900 to monitor a plant process and coordinate and schedule plant devices (e.g., the controllers and field devices) by communicating via a set of input output I/O devices or interfaces. FIG. 9 may illustrate a dashboard view or bird's-eye view of the plant and process where a controller can monitor key parameters 956 around and about the plant 910 with an ability to retrieve more detailed information on any particular section or device. During a normal operation of the plant this screen may be interrupted with alert message from the SSM 300 such as illustrated in FIG. 10.

At block 822, the system may display a message at the user interface device of the DCS. The message may inform the user of the DCS that an attempt or request to change a critical parameter of a field device has been placed on hold pending operator approval or operator feedback. FIG. 10 illustrates a possible message prompt 1010 that may be displayed at an operator workstation of the DCS. The message prompt may contain at least some of the following fields: an entity or user issuing the command or request 1012, the intended plant device 1014 of the command or request, a node or module of the plant device 1016, the target parameter for modification 1018, the change in the target parameter being made or requested to be made (not shown), an application or system attempting to make the change 1020, safety guidelines 1022 pertaining to the commitment of the change, and a prompt 1024 for allowing or denying the command or change request.

In some embodiments, additional parameter information may be provided to the operator by querying an event chronicle database. The event chronicle database may be a database maintained by the DCS for recording information on all parameter changes made by the DCS to a plant device such as a controller or field device. The event chronicle may contain records including at least some of the following fields: date, time, user ID, device ID, parameter name, parameter value change, and effects. Generally, the effects field of the event chronicle may provide information of any change in the process or sub-process corresponding to the plant device and the parameter change of the plant device. The effects field may additionally indicate any negative effects or additional warnings about the parameter change such as but not limited to negative effects or failure events due to the parameter value change. In some embodiments an additional field in the event chronicle may be operator remarks or notes that provide specific details or operator observations for the parameter value change. The details may include warnings about possible missteps or correlative parameter effects that need to be considered when adjusting the parameter value in the future. In some embodiments, the event chronicle may include a record field providing a warning for the parameter change. For example, the warning may indicate that the parameter value change should not be performed at a specific time as it correlates to an on-going or scheduled event.

Figure 11:
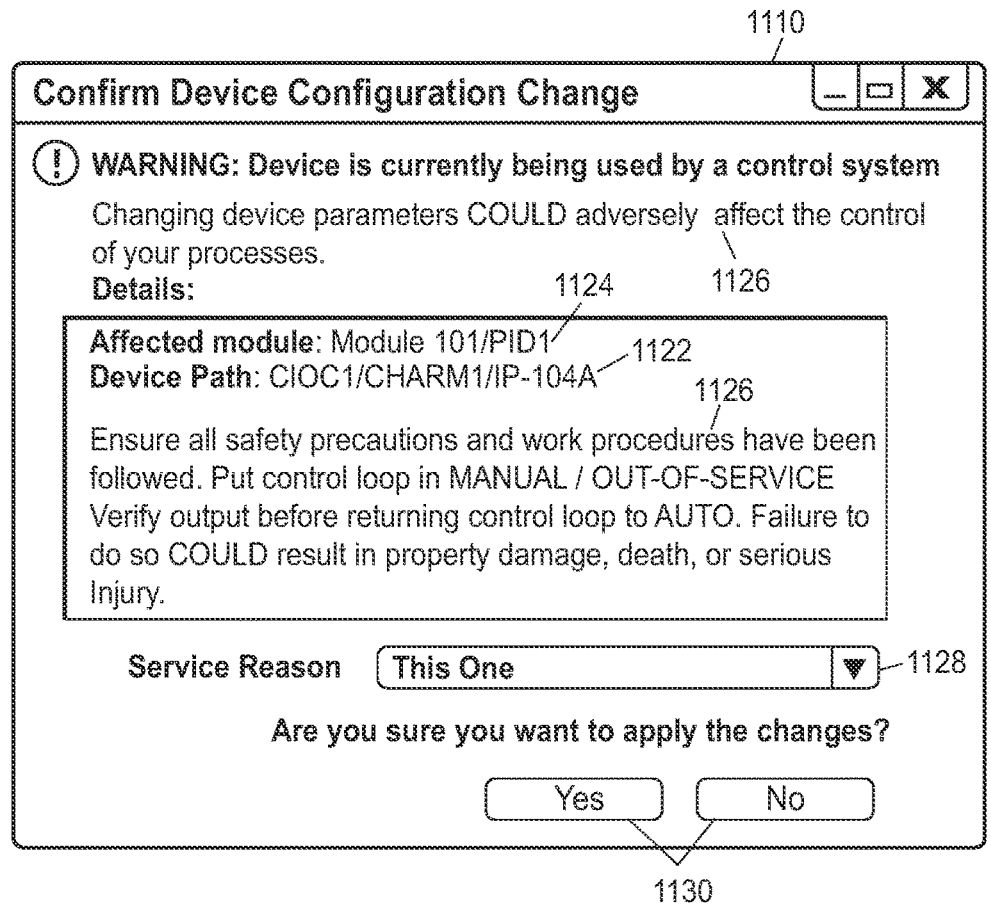
FIG. 11 illustrates a possible message corresponding to an approval response from a DCS for a parameter change command.

At block 824, the system may transmit a response from the user interface device of the DCS to a user interface device of the AMS indicating whether the critical parameter change to the controller or field device is allowed or denied or rejected. In some embodiments, the response may be transmitted when an operator at the DCS user interface clicks an approve or a deny button 1024 of a graphical user interface such as that shown in FIG. 10. Once the DCS response is transmitted, the approval process may return to the AMS where the AMS workstation may display the response from the DCS operator at block 826. FIG. 11 illustrates a possible message prompt 1110 corresponding to a response from the DCS and displayed on an AMS user interface.

At block 826, the AMS system may receive and process the response from the DCS. In some embodiments, processing the response at the DCS may involve displaying the response or information in the response to the critical parameter change command at the user interface device of the AMS. In some embodiments, the process may check at block 828 whether the response from the DCS is an approval and release the intercepted parameter change command at block 830 or otherwise terminate the parameter change command at block 832.

If the response to the critical parameter change is an approval, FIG. 11 illustrates an embodiment of a graphical user interface (GUI) that can be displayed at the user interface (e.g., workstation) of the AMS. In particular, the GUI may be displayed to a user such as an instrumentation technician showing the response from the DCS operator. The display or GUI may include some of the following fields: identification of an affected plant device 1122, identification of an affected module 1124, a safety message related to the parameter change 1126. The GUI may also include other related information not shown in FIG. 11 such as identification of the parameter and requested parameter change (e.g., values of the parameter), a reason for the decision, an indication whether the change request is approved or denied, etc. It should be noted that in some embodiments, the GUI of FIG. 11 can indicate an approval by default, since there is no indication that a parameter request is denied.

In some embodiments, block 826 and 828 may allow a user to perform additional verification or validation of a DCS allowed parameter change command. In some embodiments, the GUI of FIG. 11 may also include a field for the AMS operator to include a reason for the modification 1128 and a final verification or confirmation check button 1130 that prompts the user to verify the write command or reject it. If the user elects to allow and apply the changes at block 828, the write command may be released from the AMS to the plant device for execution or commitment at a block 830. If the user elects not to apply the changes, the write command may be terminated at a block 832. In some embodiments, upon approval, the write command may be routed to the DCS for committing to the field device. In this embodiment, the DCS may send the write command for commitment.

Figure 12:
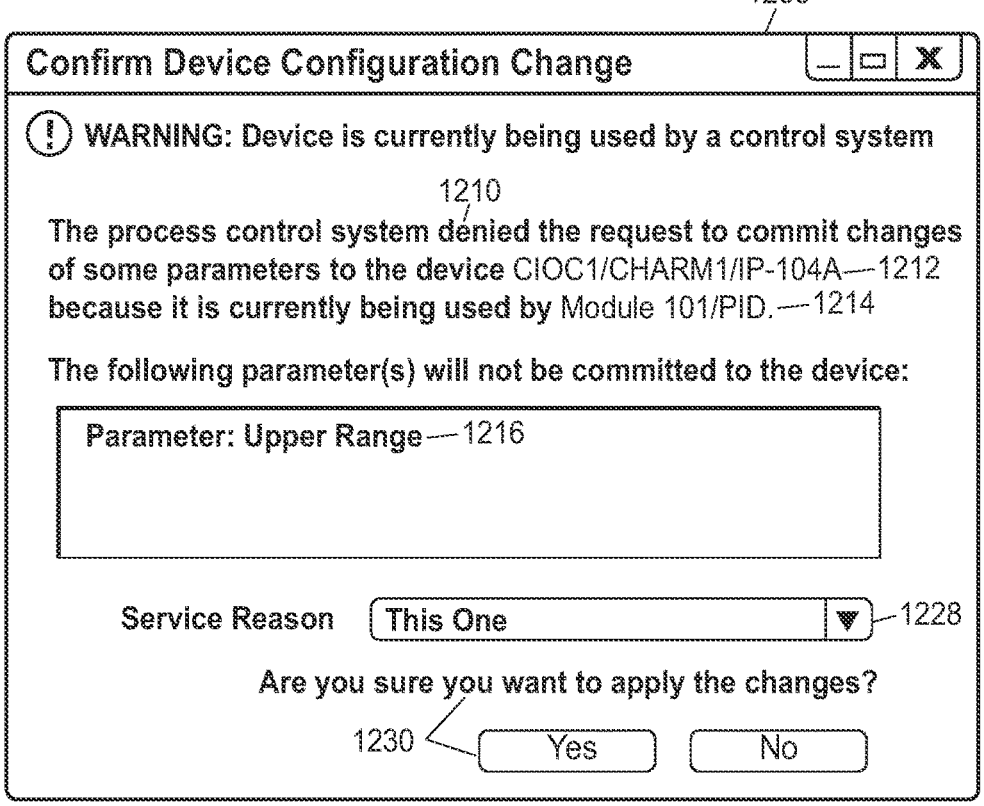
FIG. 12 illustrates a possible message corresponding to a rejection response from a DCS for a parameter change command.

If the response from the DCS operator to the critical parameter change is a rejection, the system may display a response message such as that illustrated in FIG. 12. FIG. 12 illustrates a GUI 1200 that may include the following fields: an indication that the change request is denied 1210, identification of an effected plant device 1212, identification of a control module 1214 of the plant device, and an identification of the parameter 1216 and/or requested parameter change (e.g., values of the parameter).

The AMS or a security services module (SSM) may terminate the critical parameter change command at a block 832. The termination may be immediate and automatic upon receipt of a rejection response from the DCS or in some embodiments the termination may be postponed till after a user indicates or acknowledges receiving the response message (e.g., via a screen prompt). In some embodiments, the display of FIG. 12 may include a button to acknowledge receipt of the message by a user of the AMS user interface. In this embodiment, the command may not be terminated until the user clicks the button indicating that the command will be terminated or otherwise not executed. Generally, the described method and system may provide a DCS operator priority and authority to terminate or permanently block or otherwise void or delete a change command from a system. In embodiments where the change command is placed on hold or in a wait queue, the change command may be marked or flagged or tagged for deletion at block 832.

In some embodiments, the parameter change command may include a plurality of parameter changes. In some situations, the plurality of parameters may include changes to critical parameters, such as those in a loop_warning_variables set, as well as non-critical parameters. In some embodiments, non-critical parameters may be low priority parameters that may have low impact on a process under control of a plant device. In this embodiment, the described system may allow changes to non-critical parameters to be made even though changes to the critical loop_warning_variables are rejected or denied. In some embodiments, the write command is placed on hold so that all parameters in the command are suspended until a decision is made with respect to the critical parameters. The GUI of FIG. 12 may illustrate a case with multiple parameter changes including non-critical parameters. In this case, the GUI for the response message may include a field for the AMS operator to include a reason for the modification 1228 of non-critical parameters and a final verification or confirmation check 1230. FIG. 12 illustrates a GUI where a rejection to the critical parameter change(s) is displayed with a prompt 1230 for the user to decide if the user wants to proceed with a parameter change command for non-critical parameters in the change command parameter set without the critical parameter changes. As discussed above, in some embodiments, even changes to non-critical parameters such as parameters outside the set of loop_warning_variables may require DCS operator approval. The response GUI of FIG. 12 may include other information not shown such as a reason for the denial from the DCS operator.

In some embodiments, the critical parameter changes may be voided or otherwise blocked from being sent while the non-critical parameter set in the change command is allowed to pass or be released. In some embodiments, the AMS server may simply modify the change command parameter set to implement only parameter changes that are not rejected by an operator. For example, in an embodiment where the change command includes instructions for a parameter change set, the AMS server may simply place the command in the queue at block 818, inspect the parameter change set of the command by sending a message to the DCS as in blocks 820-826 of FIG. 8 and then either release the command upon approval at block 820 or modify the parameter set to eliminate or remove the critical parameters in the parameter change set upon a rejection by the DCS of those requested changes at block 832.

Where the DCS contains a log such as an event chronicle database that captures changes made to plant devices such as field devices and resulting operational changes and noted outcomes observed by plant operators, the AMS or other second system may have a corresponding log, such as an audit trail log or database, that records testing, inspection and calibration changes to field devices made by the AMS or users of the AMS. In one embodiment, the security services module may be programmed to retrieve relevant audit trail entries relating to an intercepted command for parameter changes. For example, the security services module may query the audit trail of the AMS for information based on the parameter change requested to be modified by a change command. The audit trail log or database entries may include date and time of a plant device modification made by a secondary system such as an AMS, the type of modification, and a reason for the modification. The security services module may include this audit trail log information when it forwards a warning message to the DCS operator. The DCS operator may find the audit trail information useful in making a more informed decision whether to approve or deny the change command or change request. One situation may occur when the DCS operator would normally block or deny the change request based on information from the DCS side only, but then realizes that a priority to change a plant device parameter based on audit trail information supersedes the operators initial operational considerations. This may be the case, for example, where the audit trail shows a possible defect or serious degradation in a plant device.

Generally, the process and functionality described in FIG. 8 may be distributed between the AMS and DCS via any computing components of the AMS and DCS such as workstations or servers of each system, respectively. A separate computing device may be used to implement an SSM which may execute at least some of the function or process blocks of FIG. 8. In some embodiments, the process blocks of FIG. 8 may be divided between the AMS, DCS, and SSM. In some embodiments, the SSM may have elements implemented by both AMS workstations and DCS workstations to execute the process of FIG. 8.

Figure 13:
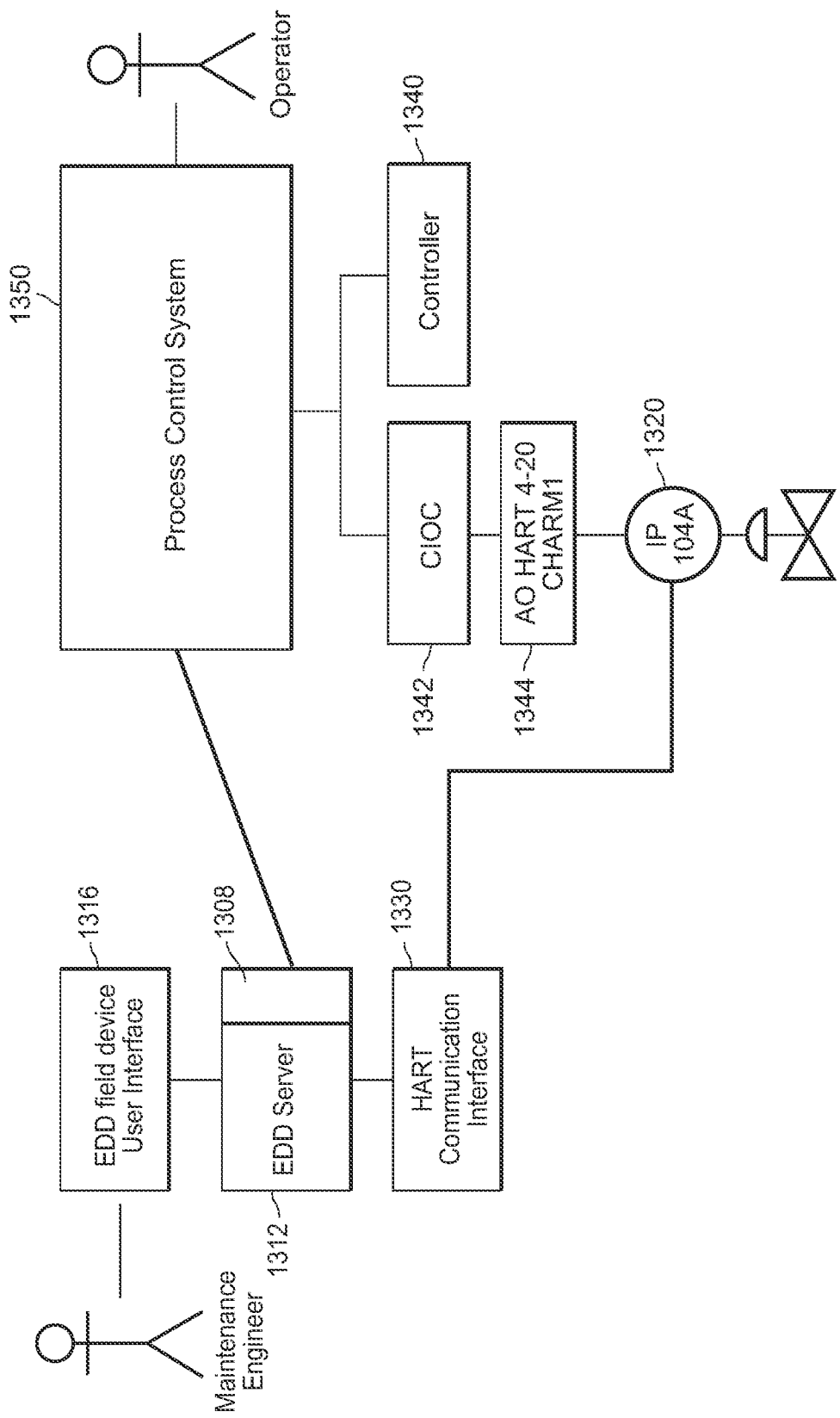
FIG. 13 illustrates a specific embodiment in which the AMS is implemented as a field device integration (FDI) server component.

FIG. 13 illustrates a specific embodiment in which the AMS is implemented as a field device integration (FDI) server component. A field device integration system is a industry standard approach to process control device access and communication using electronic device description (EDD) files. Specifically, a security services module 1308 may be programmed as a component of an FDI server 1312. A user at a workstation such as workstation 201 coupled to a common network such as network 160 may send a request for a critical parameter change to a field device using an EDD field device interface or FDI client 1316. The SSM 1308 at the FDI server 1312 may be programmed to intercept some or all such parameter change commands or requests from any one of a plurality of FDI clients 1316 as part of an AMS system. As illustrated by FIG. 13, the FDI EDD server 1312 can communicate directly with a field device 1320 such as an IP104A field device (e.g., a valve positioner) via an FDI communication server interface 1330 independently from DCS control functions communicated via a controller 1340, an I/O device such as a CHARacterization Module (CHARM) Input/Ouput Card (CIOC) 1342 (a part of Emerson Delta V process control implementations), and an analog output (AO) HART communication 4-20 mA CHARM 1 interface 1344 from a DCS workstation 1350. The SSM 1308 component of the FDI server 1312 may process a parameter change command similar to the embodiments described above. In particular, the FDI-EDD server can send a request message to the DCS 1350 for approval of the parameter change command. Based on the response of the DCS 1350, the SSM 1308 can release the parameter change command for commitment at the field device 1320 or terminate the parameter change command. It should be noted that all embodiments described above may be applicable to the implementation of FIG. 13.

Figure 14:
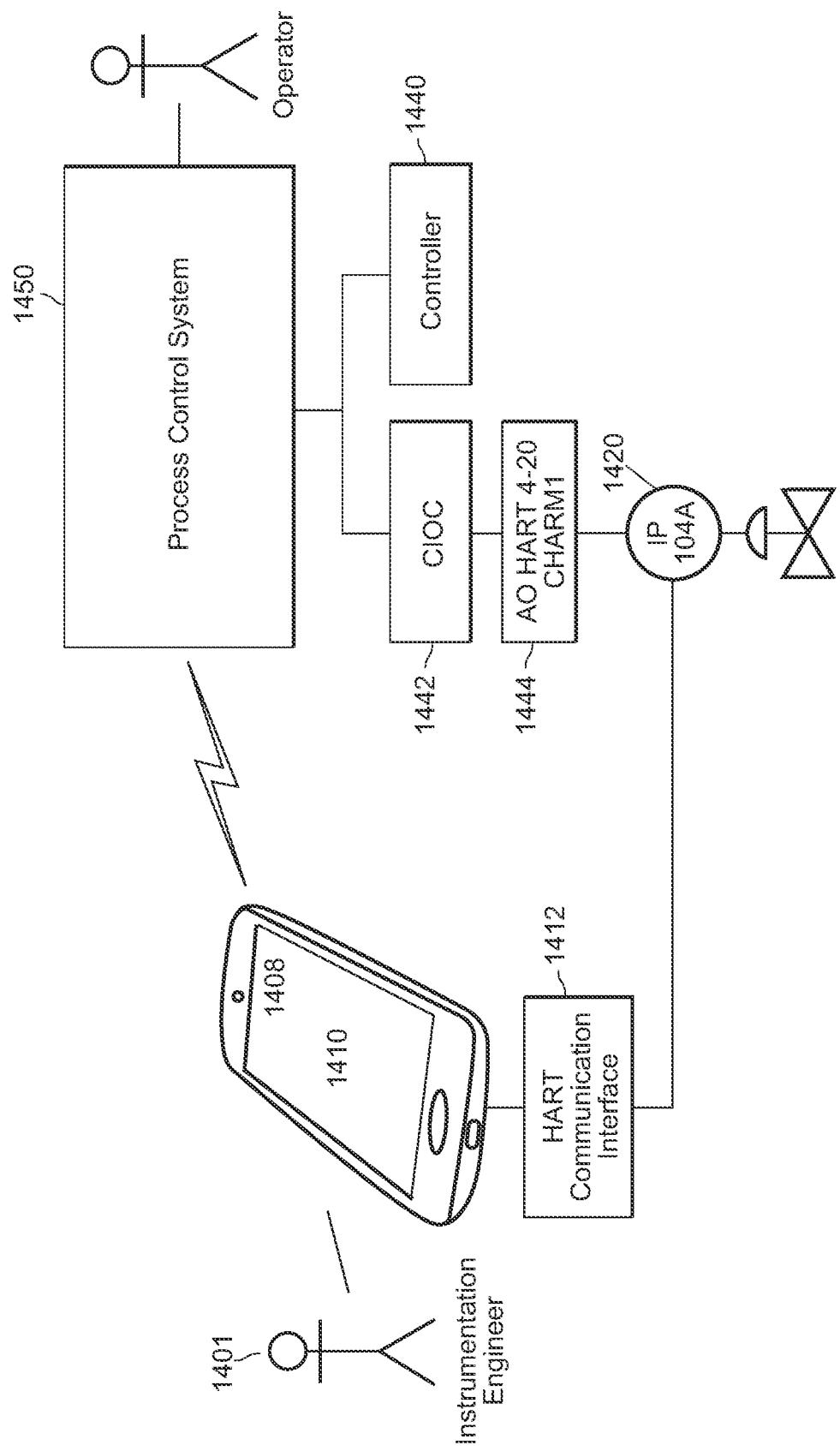
FIG. 14 illustrates an approval system employing a mobile computing device having wireless access to a DCS and a plant device.

FIG. 14 illustrates an embodiment of an approval system where an instrumentation technician 1401 may use a mobile computing device 1410 having wireless access to a DCS 1450 and access to a field device 1420 via a HART communication interface 1412. In some embodiments, the mobile device 1410 may physically and directly couple to the field device 1420 in the process plant via the communication interface 1412. A DCS workstation 1450 may monitor and control a field device 1420 using a corresponding controller 1440, an I/O 1442, and an interface 1444. In this embodiment, an SSM 1408 may be programmed as a component of the mobile device 1410. The SSM 1408 may use a wireless communication link to the DCS 1450 and the same or similar process of approving a parameter change command may be implemented as described above.

The following additional considerations apply to the foregoing discussion. Throughout this specification, actions described as performed by any device or routine generally refer to actions or processes of a processor manipulating or transforming data according to machine-readable instructions. The machine-readable instructions may be stored on and retrieved from a memory device communicatively coupled to the processor. That is, methods described herein may be embodied by a set of machine-executable instructions stored on a computer readable medium (i.e., on a memory device). The instructions, when executed by one or more processors of a corresponding device (e.g., a server, a user interface device, etc.), cause the processors to execute the method. Where instructions, routines, modules, processes, services, programs, and/or applications are referred to herein as stored or saved on a computer readable memory or on a computer readable medium, the words "stored" and "saved" are intended to exclude transitory signals.

Further, while the terms "operator," "personnel," "person," "user," "technician," and like other terms are used to describe persons in the process plant environment that may use or interact with the systems, apparatus, and methods described herein, these terms are not intended to be limiting. Where a particular term is used in the description, the term is used, in part, because of the traditional activities in which plant personnel engage, but is not intended to limit the personnel that could be engaging in that particular activity.

Additionally, throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Unless specifically stated otherwise, discussions herein using words such as "processing," "computing," "calculating," "determining," "identifying," "presenting," "causing to be presented," "causing to be displayed," "displaying," or the like may refer to actions or processes of a machine (e.g., a computer) that manipulates or transforms data represented as physical (e.g., electronic, magnetic, biological, or optical) quantities within one or more memories (e.g., volatile memory, non-volatile memory, or a combination thereof), registers, or other machine components that receive, store, transmit, or display information.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f) and/or pre-AIA 35 U.S.C. § 112, sixth paragraph.

Moreover, although the foregoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this patent, which would still fall within the scope of the claims.

What is claimed:

1. A method of validating critical parameter changes to a device in a distributed process control system (DCS) including at least one controller and one field device and having an asset management system (AMS) different from the DCS and communicatively coupled to at least one of the controller or field device of the DCS independently from the DCS comprising:
    intercepting a parameter change command for a process control device originating from the asset management system (AMS), wherein the parameter change command includes instructions to modify at least a set of critical parameters of the process control device;
    transmitting a warning message to a workstation of the distributed process control system (DCS) indicating that a parameter change command for the process control device is intercepted, wherein the warning message contains a set of warning parameters including at least a user identifier, a plant device identifier, and the set of critical parameters of the process control device to be modified by the parameter change command;
    displaying the warning message at the workstation of the DCS;
    receiving a response from the workstation of the DCS at a workstation of the AMS indicating whether to allow the parameter change command to modify the set of critical parameters of the process control device;
    displaying the response from the DCS at the user interface device of the AMS; and
    if the response to modify the set of critical parameters of the process control device is a rejection response, terminating the instructions to modify the set of critical parameters of the parameter change command.

2. The method of claim 1, wherein intercepting a parameter change command for a process control device comprises suspending the parameter change command before the command is received by the process control device.

3. The method of claim 1, further comprising providing additional parameter information from the DCS in the response to the warning message, and wherein displaying the response to the parameter change command at the AMS includes displaying the additional parameter information.

4. The method of claim 3, wherein the additional parameter information includes information on prior changes to the set of critical parameters of the process control device and previous effects on a process being controlled by the process control device based on the prior changes.

5. The method of claim 4, further comprising prompting the user at the AMS workstation to verify the parameter change command once the response and additional parameter information has been displayed; and
    upon verifying the parameter change command at the user interface of the AMS, committing the set of parameter changes to the process control device.

6. The method of claim 3, further comprising sending additional information on the set of critical parameters from the AMS to the DCS for display at the DCS workstation, wherein the additional information includes a description of a prior change initiated by the workstation of the AMS on one more parameters to be modified by the parameter change command and a reason for a current change to the one or more parameters of the parameter change command.

7. The method of claim 1, wherein the parameter change command is a command to modify a plurality of parameters including the set of critical parameters of the process control device and a set of non-critical parameters outside the set of critical parameters.

8. The method of claim 7, wherein if the response to modify the set of critical parameters of the process control device is a rejection response, terminating changes to the set of critical parameters while allowing changes to the set of non-critical parameter to be committed to the process control device.

9. The method of claim 1, wherein the user interface device of the AMS is generated based on an electronic device description (EDD) processed by an EDD server.

10. The method of claim 9, wherein transmitting a warning message to a workstation of the distributed process control system (DCS) is performed by the EDD server.

* * * * *

UNITED STATES PATENT AND TRADEMARK OFFICE
CERTIFICATE OF CORRECTION

Page 1 of 2

PATENT NO. : 11,374,902 B2
APPLICATION NO. : 16/675380
DATED : June 28, 2022
INVENTOR(S) : Joseph Aballe Bacus et al.

It is certified that error appears in the above-identified patent and that said Letters Patent is hereby corrected as shown below:

In the Specification

At Column 1, Line 21, "have" should be -- have been --.

At Column 2, Lines 17-18, "distributed process control system (DCS)." should be -- distributed control system (DCS) process. --.

At Column 2, Line 37, "an" should be -- a --.

At Column 3, Line 32, "distributed process control system (DCS) 12" should be -- distributed control system (DCS) 12 process --.

At Column 4, Lines 14-15, "distributed process control system (DCS) 112." should be -- distributed control system (DCS) 112 process. --.

At Column 5, Line 26, "may" should be -- may be --.

At Column 5, Line 65, "a" should be -- an --.

At Column 6, Line 11, "be" should be -- to be --.

At Column 7, Line 6, "to" should be -- of --.

At Column 7, Line 11, "simply" should be -- simple --.

At Column 9, Line 15, "distributed process control system (DCS)" should be -- distributed control system (DCS) process --.

Signed and Sealed this
Sixteenth Day of December, 2025

John A. Squires
*Director of the United States Patent and Trademark Office*

CERTIFICATE OF CORRECTION (continued)
U.S. Pat. No. 11,374,902 B2

At Column 9, Line 67, "of any" should be -- on any --.

At Column 10, Line 55, "whether" should be -- of whether --.

At Column 12, Line 34, "whether" should be -- on whether --.

At Column 12, Line 56, "is a" should be -- is an --.

At Column 13, Line 7, "Input/Ouput" should be -- Input/Output --.

At Column 13, Line 26, "couple" should be -- coupled --.

In the Claims

At Column 15, Line 10, "distributed process control system (DCS)" should be -- distributed control system (DCS) process --.

At Column 15, Line 22, "distributed process control system (DCS)" should be -- distributed control system (DCS) process --.

At Column 16, Lines 43-44, "distributed process control system (DCS)" should be -- distributed control system (DCS) process --.